United States Patent [19]

Lubowitz et al.

[11] Patent Number: 4,476,184

[45] Date of Patent: Oct. 9, 1984

[54] THERMALLY STABLE POLYSULFONE COMPOSITIONS FOR COMPOSITE STRUCTURES

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 521,629

[22] Filed: Aug. 9, 1983

[51] Int. Cl.$^3$ .............................................. C08G 73/12
[52] U.S. Cl. .................................. 428/288; 427/350; 427/385.5; 428/290; 528/170; 548/435; 548/476; 548/547
[58] Field of Search ........................ 428/288, 290, 419; 526/259, 262; 528/170; 548/435, 547, 476; 427/350, 385.5

[56] References Cited

U.S. PATENT DOCUMENTS

| | | |
|---|---|---|
| 3,236,808 | 2/1966 | Goldberg et al. |
| 3,265,708 | 8/1966 | Stiteler .............................. 260/326.5 |
| 3,355,272 | 11/1967 | D'Alessandro |
| 3,536,570 | 10/1970 | Aclonry et al. .................... 528/170 |
| 3,562,223 | 2/1971 | Bargain et al. |
| 3,631,222 | 12/1971 | Vogel et al. |
| 3,658,938 | 4/1972 | Kwiatkowski |
| 3,761,441 | 9/1973 | D'Alessandro et al. ............ 528/172 |
| 3,770,697 | 11/1973 | Holub et al. ...................... 528/170 |
| 3,773,718 | 11/1973 | Klebe et al. |
| 3,787,363 | 1/1974 | Staniland et al. |
| 3,812,159 | 5/1974 | Lubowitz |
| 3,839,287 | 10/1974 | Kwiatkowski ...................... 528/172 |
| 3,879,349 | 4/1975 | Bilow et al. |
| 3,897,393 | 7/1975 | Lu |
| 3,935,167 | 1/1976 | Marvel et al. |
| 4,097,456 | 6/1978 | Barie |
| 4,100,138 | 7/1978 | Bilow et al. |
| 4,107,153 | 8/1978 | Akiyama et al. |
| 4,108,837 | 8/1978 | Johnson et al. |
| 4,108,926 | 8/1978 | Arnold et al. |
| 4,116,937 | 9/1978 | Jones et al. |
| 4,166,168 | 8/1979 | D'Alelio |
| 4,176,223 | 11/1979 | Irwin .................................. 528/172 |
| 4,239,883 | 12/1980 | Stenzenberger .................... 528/170 |
| 4,297,474 | 10/1981 | Williams ............................ 528/170 |
| 4,414,269 | 11/1983 | Lubowitz et al. .................. 428/290 |

FOREIGN PATENT DOCUMENTS 2002378 4/1983 United Kingdom.

OTHER PUBLICATIONS

Sheppard et al., "Development of Modified Polysulfone Resins", Final Report on Contract N00019-77-C-0561, Boeing Aerospace Co., Dec. 1981.

Jaquish et al., "Graphite Reinforced Thermoplastic Composites", Final Report on Contract N00019-79-C-0203, Boeing Aerospace Co., Aug. 1980.

Primary Examiner—Marion E. McCamish
Attorney, Agent, or Firm—Finnegan, Henderson, Farabow, Garrett & Dunner

[57] ABSTRACT

Resins are prepared from polymers that bear monofunctional or difunctional groups derived from compounds that are condensation products of amino-phenols and acid anhydrides. The polymers are prepared by coreacting aromatic compounds holding two hydroxyl groups, aromatic compounds holding two active halogen groups, and the condensation product of amino-phenol and acid anhydride, the condensation product holding one hydroxyl group. The resulting product has a molecular weight between about 1,000 and 40,000, preferably between about 5,000 and 30,000, and can be cross-linked to form a resin that is thermoplastic and solvent resistant.

20 Claims, 1 Drawing Figure

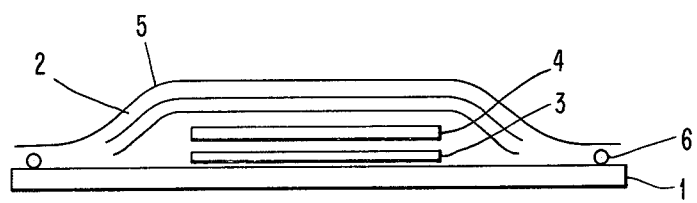

THERMALLY STABLE POLYSULFONE COMPOSITIONS FOR COMPOSITE STRUCTURES

BACKGROUND OF THE INVENTION

The present invention relates to resins containing polymer chains that bear functional chemical groups and to the products thereof. In particular, linear polysulfone and polyethersulfone polymers or oligomers are synthesized with thermally and/or chemically active functional groups at the end of the chains. These groups, at a subsequent time, are activated to yield chemically cross-linked polysulfones and polyethersulfones.

For many applications, it is desirable to employ thermoplastic resins. Although such resins and their applications are well known, the use of thermoplastic resin reinforced by fiber is a relatively new art. The advantages of this art are significant. Fiber toughens and stiffens the resin to produce high performance products. At the same time, processing is facilitated because the fiber reinforced resin maintains its thermoplastic character. For example, a sheet of fiber reinforced resin can be heated and then stamped into desired shapes of appropriate metal dies. Furthermore, shapes can be altered as desired.

On the other hand, although thermosetting resins are generally used in fabricating fiber reinforced composites, fashioning shapes by thermoforming is not readily possible when thermosetting resins are used. Such products must be fashioned within the constraints of dies. Once formed, they cannot be reshaped; thus, errors are not correctable and shape adjustments are not possible. A sheet of fiber reinforced thermosetting resin, fully cured, cannot be thermoformed into the desired shapes. Although thermoplastic resins exhibit processing advantages over themosetting resins, they exhibit, in general, a serious deficiency in properties, i.e., a tendency to be solvated and thus weakened by organic solvents. This deficiency has severely limited the application of fiber reinforced thermoplastic resin composites. For example, circuit boards, boards prepared from fiber reinforced thermoplastic resin, cannot be cleaned by solvents commonly used in the manufacture of circuit boards. In the use of thermoplastic composites for aircraft, a signficant amount of product loss is incurred when aircraft hydraulic fluids and cleaning fluids come into contact with composites.

SUMMARY OF THE INVENTION

One of the objects of the present invention is to provide a series of thermoplastic resins that resist attack by organic solvents.

Another object is to provide thermoplastic resins composed of polymers having aromatic-group-containing backbones. Such backbones contribute to the thermal stability of the resins.

It is another object of the invention to provide solvent resistant polysulfone and polyethersulfone polymers that can be crosslinked by thermal and/or chemical activation.

It is another object of this invention to realize thermally stable resins that resist chemical stress corrosion, particularly in the presence of organic solvents.

Another object of the present invention is to provide compositions that are suitable for use as laminating materials and as adhesives.

Another object of the present invention is to provide laminates that can be thermoformed.

A further object of the invention is to provide laminates that are tough, thermally stable, and resistant to attack by solvents.

Another object is to provide laminates that are chemically stable, particularly against oxidation.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects in accordance with the purpose of the invention, as embodied and broadly described herein, the invention comprises a cross-linkable polymer formed by reacting:

(1) 2 moles of A—OH
(2) n+1 mole Z—R—Z and,
(3) n moles OH—R'—OH, wherein A is

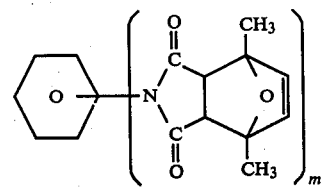

wherein m is 1 or 2 wherein Z is selected from the group consisting of fluorine, chlorine, and bromine, and preferably is chlorine, wherein R is an aromatic radical, wherein R' is an aromatic radical and wherein n is selected so that the polymer has a molecular weight between about 1,000 and 40,000. The preferred molecular weight for this precursor polymer is between about 5,000 and about 30,000, more preferably between about 10,000 and 20,000. Preferably R is selected from the group consisting of

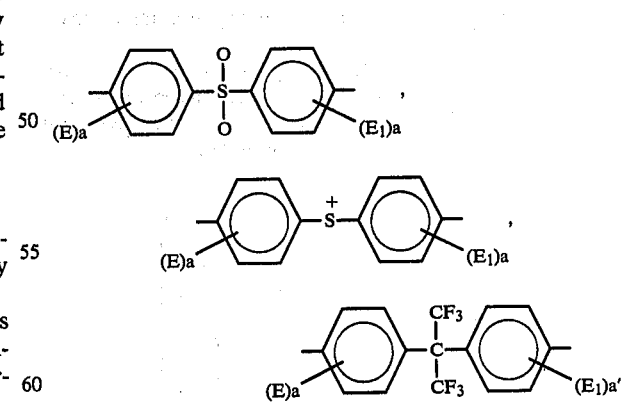

and R' is selected from the group consisting of

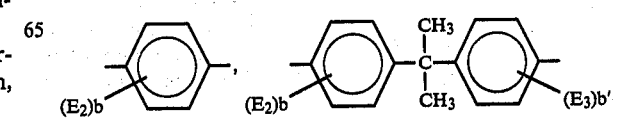

-continued

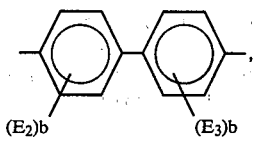

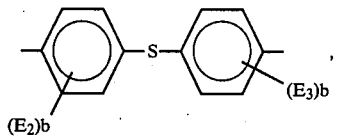

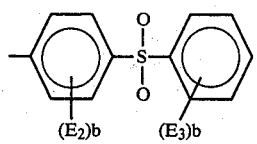

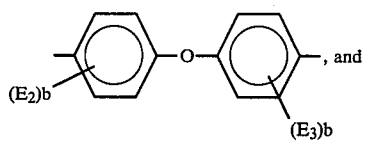, and

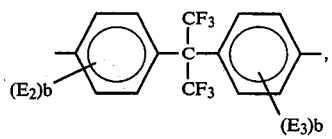

Wherein E, $E_1$, $E_2$, and $E_3$ each represent substituent groups selected from the group consisting of halogen, alkyl groups having 1 to 4 carbon atoms and alkoxy groups having 1 to 4 carbon atoms, and a and b are each an integer having a value of 0 to 4.

Further to achieve the foregoing objects in accordance with the purpose of the invention, as embodied and broadly described herein, the invention comprises a method for making the aforementioned polymer comprising (a) mixing compounds (1), (2), and (3) and a scavenger in a solvent in the presence of an inert atmosphere, and (b) heating the mixture to react the compounds.

Further to achieve the foregoing objects in accordance with the purpose of the present invention as embodied and broadly described herein, the invention comprises compounds having the formula:

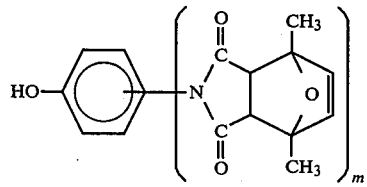

wherein m is 1 or 2.

Still further to achieve the foregoing objects in accordance with the purpose of the invention, as embodied and broadly described herein, the invention comprises a method of synthesizing the aforementioned compounds comprising reacting 1 or 2 moles of a compound having the formula:

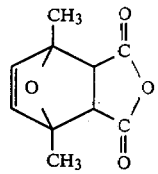

with 1 mole of a compound selected from the group of compounds having the formulas

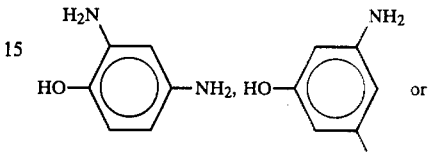

The foregoing and other objects, features, and advantages of the present invention will be made more apparent from the following description of the preferred embodiments.

The accompanying drawing, which is incorporated in and constitutes a part of this specification, illustrates a method of curing the polymer of the present invention and, together with the description, serves to explain the principles of the invention.

BRIEF DESCRIPTION OF THE DRAWING

The drawing illustrates securing a fabric impregnated with the polymer of the present invention in a vacuum bag.

DESCRIPTION OF PREFERRED EMBODIMENTS

Reference will now be made in detail to the presently preferred embodiments of the invention.

The objects of this invention are realized through the use of resins prepared from polymers, particularly polysulfone and polyethersulfone polymers that bear one or more terminal functional groups. The polymers are prepared in solvent polymerization by coreacting aromatic compounds holding 2 hydroxyl groups (the dihydroxy component), aromatic compounds holding 2 active halogen groups, preferably chlorine groups (the dihalo component), and a condensation product of amino-phenol and acid anhydride, the condensation product holding 1 hydroxyl group (the monohydroxy component). The polymer product molecular weights are adjusted by predetermined combinations of these three components.

In accordance with the invention, as embodied herein, the cross-linkable polymers of the present invention are formed by reacting:

(1) 2 moles A—OH, per
(2) n+1 moles Z—R—Z and
(3) n moles OH—R'—OH,
wherein A is

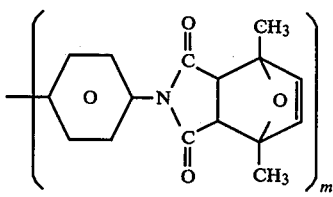

wherein m is 1 or 2, wherein Z is selected from the group consisting of fluorine, chlorine, bromine, and preferably is chlorine, wherein R is an aromatic radical, wherein R' is an aromatic radical and wherein n is selected so that the polymer has a molecular weight between about 1,000 and 40,000. Preferably at least one of said aromatic radicals R and R' contains a diaryl radical wherein the aryl rings are joined together by a sulfone linkage. The resulting product has the formula:

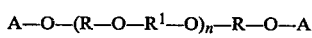

This reaction is carried out by mixing the three compounds with a scavenger in a solvent in the presence of an inert atmosphere and heating the mixture to react the compounds.

The term "scavenger" refers to chemically active substances which remove undesirable reaction products. Preferred scavengers are potassium carbonate and sodium carbonate. Other scavengers such as sodium hydroxide and potassium hydroxide may also be useful. The scavenger is preferably used in slight excess of molar quantities, e.g., about 10% more than molar quantities, and ensures that the solution remains basic. It is also possible that the scavenger participates in the reaction. In any event, the scavenger should be employed in the reaction to form the oligomeric composition.

The OH group of the compound holding one hydroxyl group is reactive, as are the OH groups of the aromatic compounds holding two hydroxyl groups, which makes the reaction possible. As indicated above, the molecular weight of the resulting oligomer should range between 1,000 and 40,000, and preferably between about 5,000 and 30,000 and still more preferably between about 10,000 and 20,000. Mixtures of oligomers having molecular weights within these ranges may also be used, for example, a mixture of an oligomer having a molecular weight of 10,000 with an oligomer having a molecular weight of 20,000, or a mixture of an oligomer with a molecular weight of 5,000 with an oligomer having a molecular weight of 10,000 or 20,000. Within these ranges, the oligomers can be crosslinked to form thermoplastic polymers that are insoluble. The oligomer itself, however, is soluble and therefore may be easily processed, such as by impregnating a fabric of glass or other appropriate material.

An oligomer with a molecular weight lower than about 1,000 would undergo excessive cross-linking and lose its thermoplastic properties and, consequently, have the disadvantages associated with thermosetting resins. If the oligomer has a molecular weight of more than about 40,000, insufficient cross-linking will occur and the resulting resin will have inadequate solvent resistance, as with prior thermoplastic resins. Within the above described range, the cross-linked oligomer has the beneficial properties of both thermoplastic and thermosetting resins without the disadvantages of either.

Typical compounds holding two active hydroxyl groups that may be used in the process of the invention include:

TABLE I

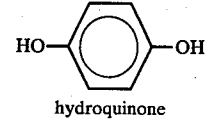
hydroquinone

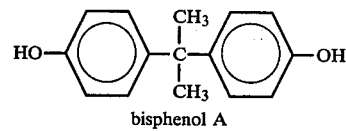
bisphenol A

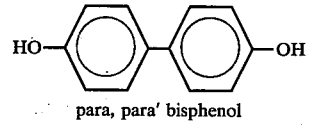
para, para' bisphenol

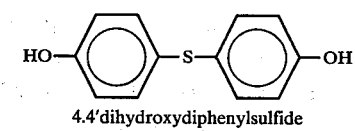
4.4'dihydroxydiphenylsulfide

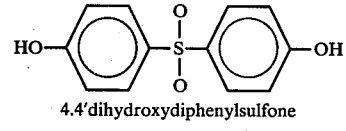
4.4'dihydroxydiphenylsulfone

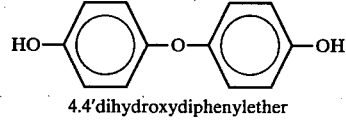
4.4'dihydroxydiphenylether

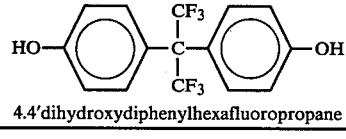
4.4'dihydroxydiphenylhexafluoropropane

Each of the illustrated compounds holding two active hydroxyl groups could also be replaced by the ortho or meta isomer. Mixtures of the compounds holding two active hydroxyl groups may also be used. The compounds may be substituted on the aromatic ring with halogens or alkyl groups having from 1 to 4 carbon atoms and alkoxy groups having 1 to 4 carbon atoms. A preferred compound is bisphenol A, but replacing a portion of bisphenol A with other selected compounds holding two active hydroxyl groups can add rigidity to the product without increasing the molecular weight, and therefore can render the cross-linked oligomer more solvent resistant. The different compounds holding two active hydroxyl groups may be added in such a manner that the oligomer is a random or a block copolymer.

Typical compounds holding two active halogens that may be used in the process of this invention include:

TABLE II

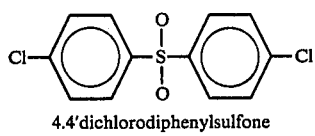

4.4'dichlorodiphenylsulfone

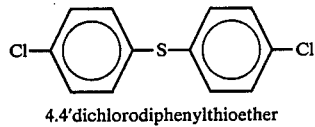

4.4'dichlorodiphenylthioether

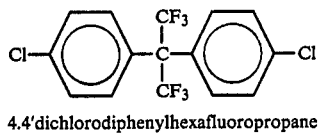

4.4'dichlorodiphenylhexafluoropropane

The two active chlorines could also be in the ortho or meta position. Mixtures of the compounds holding two active halogens may also be used. Furthermore, the chlorine atoms could be replaced by fluorine or bromine. As indicated above, both the compounds holding two active hydroxyl groups and the compounds holding two active halogens may be substituted on the aromatic rings with halogens or alkyl groups having from 1 to 4 carbon atoms and the alkoxy groups having from 1 to 4 carbon atoms.

Typical compounds holding one active hydroxyl group that may be used in the process of this invention include:

TABLE III

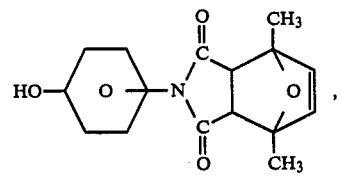

1-Hydroxyphenyl 4(3,6 dimethyl) oxynadimide

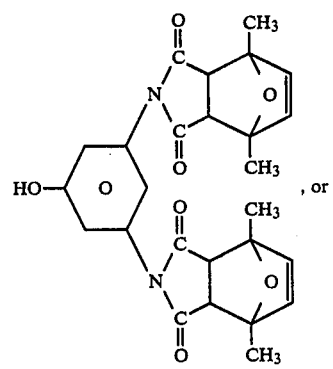

1-Hydroxyphenyl 3,5 di (3,6 dimethyl) oxynadimide

TABLE III-continued

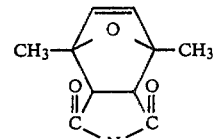

1-Hydroxy 2,4 di (3,6 dimthyl) oxynadimide

Mixtures of the compounds holding one active hydroxyl group may also be used.

The compounds holding one active hydroxyl group set forth in Table III in accordance with the present invention may be synthesized by reacting 1 or 2 moles of a compound having the formula:

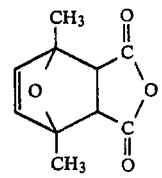

(3,6-dimethyl 3,6 endo-oxy 1, 2, 3, 6 tetrahydrophthalic anhydride) with one mole of a compound having the formula

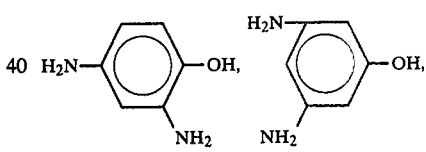

in a solvent in the presence of an inert atmosphere.

The polymers prepared from combinations of the compounds in Tables I, II, and III are capable of cross-linking upon the application of heat. Temperatures suitable for "curing" the polymers are in the range of 350° to 600° F., with the preferred range being 400° to 500° F.

Lower curing temperatures may be used when certain coreactants are used. Roughly equivalent quantities of coreactant and oligomer may be used, with an excess of coreactant being preferred to insure that the most reactive sites are used. The coreactants accelerate the curing reaction and increase solvent resistance while decreasing the thermoplasticity of the resin.

Coreactants suitable for cross-linking the polymers of the present invention, all of the polymers containing the 3,6-dimethyl 3,6-endo oxynorbornene group

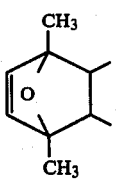

are given in Table IV.

TABLE IV

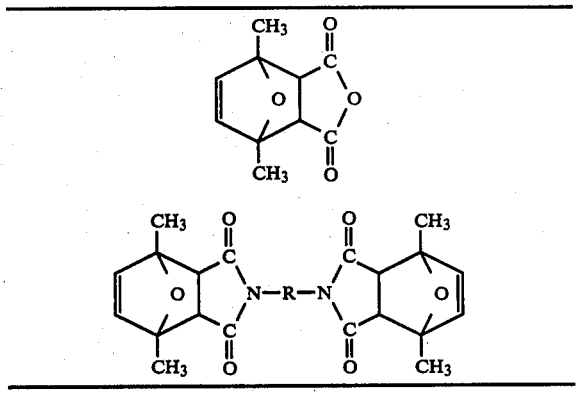

where R is an alkyl having 2 to 6 carbon atoms or an aromatic radical such as:

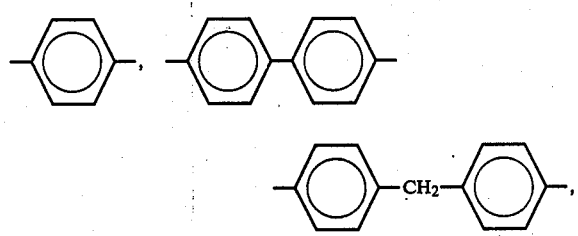

The polymer of the invention, as embodied herein may be used to form a prepreg by impregnating a fabric with the polymer. The prepreg may then be cured, such as by vacuum bagging and heating at elevated temperature while under pressure. This is illustrated in the drawing, in which 1 is a caul (a metal backing for applying a surface finish), 2 is a vacuum source, 3 is a prepreg, 4 is a pressure plate, 5 is a Kapton film (Dupont polyimide film), 6 is a silicon sealant, and 7 is Kisch (zinc chromate tape).

The following examples are presented to illustrate the various features of the invention:

EXAMPLES OF SYNTHESIS OF ONE ACTIVE HYDROXYL COMPOUNDS FROM TABLE III

EXAMPLE 1

Projected synthesis of 1-hydroxyphenyl 4-(3,6 dimethyl) oxynadimide.

Under dry $N_2$, prepare a slurry of 14.4 g (0.1 moles) of purified 4-aminophenol hydrochloride containing 10 percent solids in 17.39 g of N,N-dimethylacetamide. Gradually add 16.80 g (0.2 moles) dry $NaHCO_3$ as a powder. After foaming subsides, gradually add 65.61 g xylene and 19.60 g (0.1 moles) 3,6-dimethyl 3,6 endo oxy 1,2,3,6 tetrahydrophthalic anhydride. Attach a Barrett trap filled with xylene, and heat the reaction mixture to reflux (150° C.) until no more water collects in the Barrett trap. Precipitate the product in water, collect it by filtration, and wash well. The expected melting range is approximately 250°–260° C.

EXAMPLE 2

Projected synthesis of 1-hydroxyphenyl-3,5-di(3,6-dimethyl) oxyanadimide

Example 1, is repeated except that 3,5-diaminophenol dihydrochloride is substituted for 4-aminophenol hydrochloride and 39.20 g (0.2 moles) of 3,6-dimethyl 3,6 endo-oxy 1,2,3,6 tetrahydrophthalic anhydride is used.

EXAMPLES OF SYNTHESIS OF OLIGOMERS OF THE PRESENT INVENTION

EXAMPLE 3

Projected Synthesis of 1-hydroxyphenyl, 3,6-dimethyl-oxynadimide 10% excess, 20% excess $K_2CO_3$, Formula molecular weight 20,000

In a 1000-ml resin kettle fitted with a mechanical stirrer, thermometer, condenser, Dean Stark trap, and under dry $N_2$, add 405.8 grams of dimethylacetamide and 173.9 grams of toluene. Charge 3.79 grams (0.014 mole) of 1-hydroxyphenyl 4-(3,6-dimethyl)oxynadimide (the compound to be made in Example 1), 98.35 grams (0.273 mole) of 4,4'dichlorodiphenylsulfone, 60.87 grams (0.267 mole) bisphenol A, and 45.25 grams potassium carbonate. Heat the mixture to 140° C. and hold for 72 hours. Raise the temperature of the mixture to 160°–165° C. by removing the toluene into the Dean Stark trap and then hold the mixture for 1 hour. Cool the mixture to ambient conditions.

EXAMPLE 4

Projected Synthesis of 1-hydroxyphenyl-3,5-di-(3,6-dimethyl)oxynadimide 10% excess, 20% excess $K_2CO_3$, Formula molecular weight 20,000

Using the same procedure as in Example 3, substitute 6.48 g (0.014 moles) 1-hydroxyphenyl-3,5-di-(3,6-dimethyl)oxynadimide (the compound to be made in Example 2) for 1-hydroxyphenyl 4-(3,6-dimethyl)oxynadimide.

EXAMPLE 5

(GENERAL METHOD OF PREPARATION OF COMPOSITES FROM OLIGOMERS OF THE PRESENT INVENTION)

The polysulfone oligomer to be obtained from Example 3 or 4 is impregnated on epoxysized T300/graphite fabric style (Union Carbide 35 million modulus fiber 24×24 weave) by first obtaining a 10 to 15% resin solids solution with methylene chloride. A weighed length of graphite fabric is laid flat on a release film of FEP (fluorinated ethylene propylene film). The dilute resin solution is swept into the fabric taking care to wet the fibers as well as possible. The prepreg is allowed to air dry and turned. The procedures are repeated for the reverse side. The solution is coated onto the dry graphite fabric such that 38 percent by weight of the resulting prepreg will be the polysulfone oligomer. The prepreg is allowed to dry under ambient conditions to less than 1 percent volatile content. The prepreg is then cut into 6×6-inch pieces and stacked to obtain a consolidated composite of approximately 0.080 inch. The stack of prepreg is then vacuum bagged and consolidated under 100 psi in an autoclave heated to 450° F. for a minimum period of 6 hours to cure. See the drawing.

It will be apparent to those skilled in the art that various modifications and variations can be made in the methods of the present invention without departing from the scope or spirit of the invention. Thus, it is intended that the present invention cover the modifications and variations of the invention provided they come within the scope of the appended claims and their equivalents.

What is claimed is:

1. A cross-linkable polymer formed by reacting:
   (1) 2 moles of A—OH
   (2) n+1 moles of Z—R—Z and
   (3) n moles of OH—R'—OH,
wherein A is

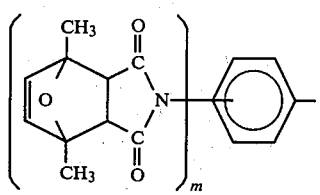

wherein m is 1 or 2, wherein Z is selected from the group consisting of fluorine, chlorine, and bromine, wherein R is an aromatic radical, wherein R' is an aromatic radical, and wherein n is selected so that said polymer has a molecular weight between about 1,000 and about 40,000.

2. The polymer of claim 1 wherein at least one of said aromatic radicals R and R' contains a diaryl radical wherein the aryl rings are connected by a sulfone linkage.

3. The polymer of claim 1 wherein R is selected from the group consisting of

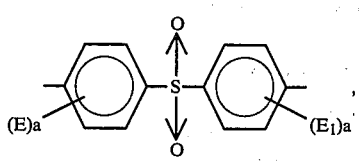

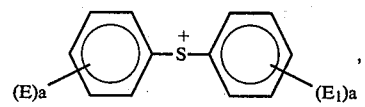

wherein R' is selected from the group consisting of

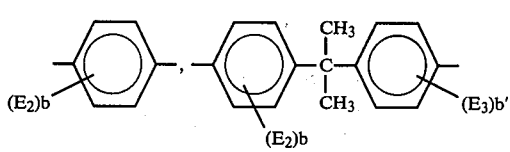

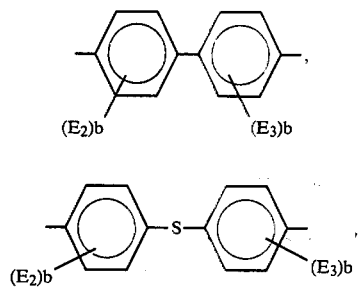

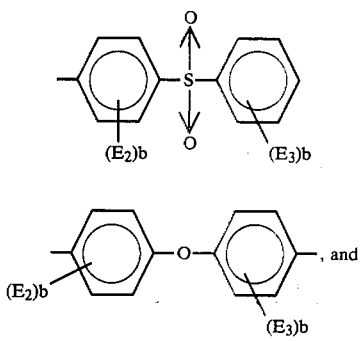

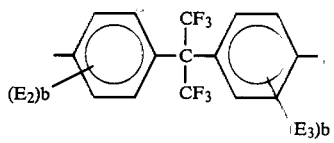

or mixtures thereof
wherein E, $E_1$, $E_2$ and $E_3$ each represent substituent groups selected from the group consisting of halogen, alkyl groups having 1 to 4 carbon atoms and alkoxy groups having 1 to 4 carbon atoms, and wherein a and b are each an integer having a value of 0 to 4.

4. A prepreg formed by impregnating a fabric with the polymer of claim 3.

5. A cured, solvent resistant, thermoplastic composite product formed by curing the prepreg of claim 4.

6. A cured, solvent resistant, thermoplastic composite product formed by curing the prepreg of claim 5 in the presence of a coreactant selected from the group consisting of:

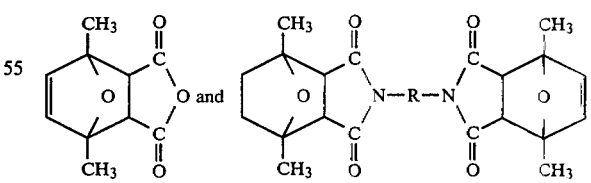

wherein R is an alkyl having 2–6 carbon atoms or an aromatic radical.

7. The polymer of claim 1 wherein Z is chlorine.

8. The polymer of claim 1 wherein n is selected so that said polymer has a molecular weight between about 5,000 and 30,000.

9. The polymer of claim 1 wherein A is

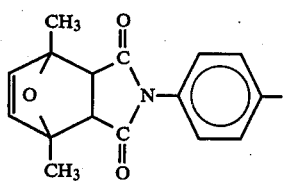

10. A prepreg formed by impregnating a fabric with the polymer of claim 1.

11. A cured, solvent resistant, thermoplastic composite product formed by curing the prepreg of claim 10.

12. A cured, solvent resistant, thermoplastic composite product formed by curing the prepreg of claim 11 in the presence of a coreactant selected from the group consisting of:

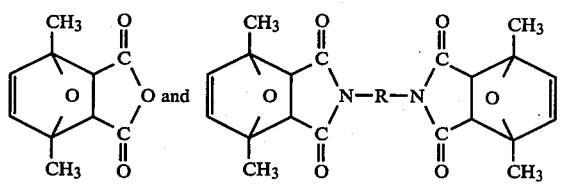

wherein R is an alkyl having 2 to 6 carbon atoms or an aromatic radical.

13. A method for making the polymer of claim 1 comprising
   (a) mixing compounds (1), (2), and (3) and a scavenger in a solvent in the presence of an inert atmosphere, and
   (b) heating said mixture to react said compounds.

14. The method of claim 13, wherein said scavenger is selected from the group consisting of potassium carbonate, sodium carbonate, sodium hydroxide and potassium hydroxide.

15. The method of claim 14, wherein the scavenger is potassium carbonate.

16. A compound having the formula:

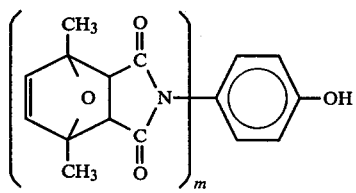

wherein m is 1 or 2.

17. The compound of claim 16 wherein m is 1.

18. A method of synthesizing the compound of claim 16, comprising reacting 1 mole of a compound having the formula

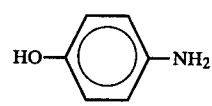

with a 1 mole of a compound having the formula

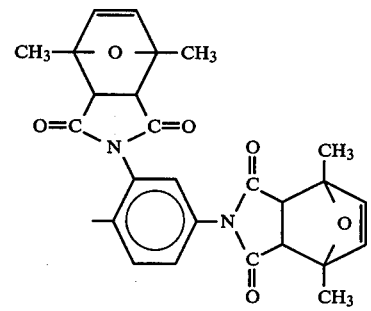

in a solvent in the presence of an inert atmosphere.

19. A compound having the formula:

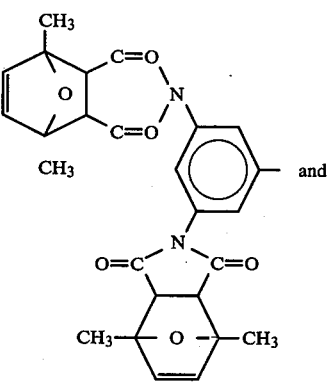

20. A method of synthesizing the compound of claim 19, comprising reacting 2 moles of a compound having the formula:

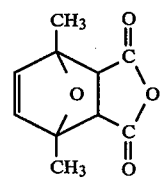

with 1 mole of a compound selected from the group of compounds having the formulas

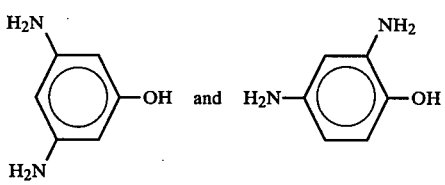

* * * * *

UNITED STATES PATENT AND TRADEMARK OFFICE
CERTIFICATE OF CORRECTION

PATENT NO. : 4,476,184

DATED : October 9, 1984

INVENTOR(S) : Hyman R. Lubowitz et al

It is certified that error appears in the above-identified patent and that said Letters Patent is hereby corrected as shown below:

Claim 6, lines 52-60, change

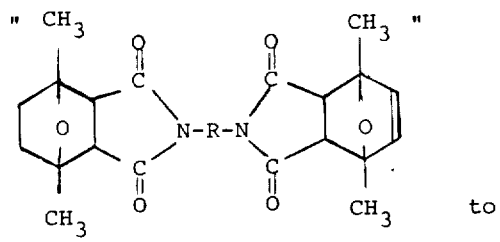

to

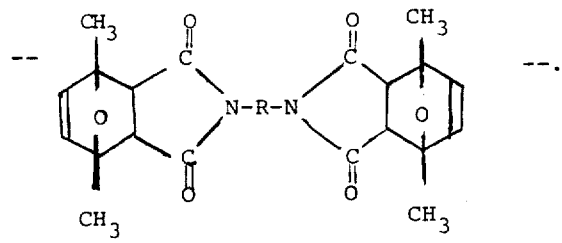

Claim 19, lines 20-30, change

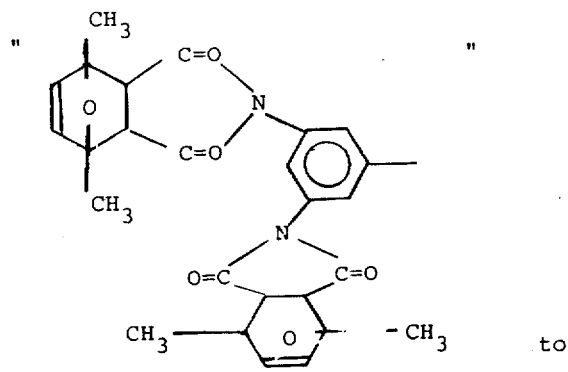

to

UNITED STATES PATENT AND TRADEMARK OFFICE
CERTIFICATE OF CORRECTION

PATENT NO. : 4,476,184

DATED : October 9, 1984

INVENTOR(S) : Hyman R. Lubowitz et al

It is certified that error appears in the above-identified patent and that said Letters Patent is hereby corrected as shown below:

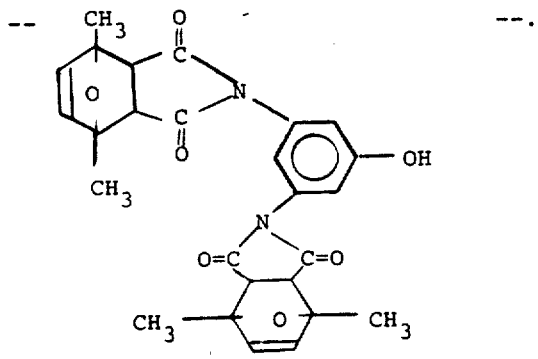

Claim 19, lines 35-45, change

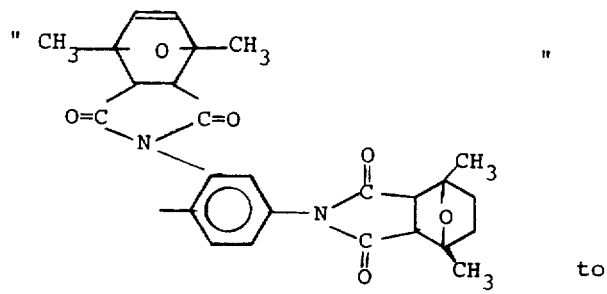

to

UNITED STATES PATENT AND TRADEMARK OFFICE
CERTIFICATE OF CORRECTION

PATENT NO. : 4,476,184
DATED : October 9, 1984
INVENTOR(S) : Hyman R. Lubowitz et al Page 3 of 4

It is certified that error appears in the above-identified patent and that said Letters Patent is hereby corrected as shown below:

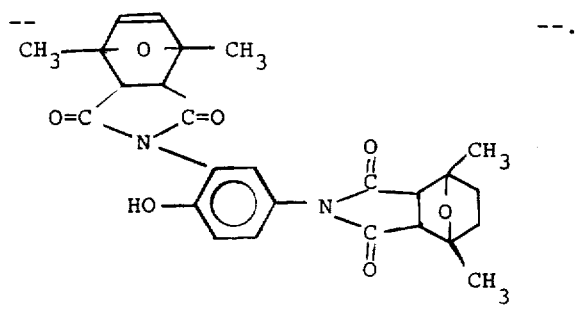

On the cover page under the heading "References Cited", the following U.S. Patent Documents should also be listed:

| | | | |
|---|---|---|---|
| 3,262,914 | 3,763,101 | 4,101,488 | 4,251,418 |
| 3,453,236 | 3,897,395 | 4,115,231 | 4,251,419 |
| 3,530,087 | 3,920,768 | 4,126,619 | 4,255,313 |
| 3,641,207 | 3,970,714 | 4,179,551 | 4,273,916 |
| 3,652,710 | 4,000,146 | 4,183,839 | 4,293,670 |

UNITED STATES PATENT AND TRADEMARK OFFICE
CERTIFICATE OF CORRECTION

PATENT NO. : 4,476,184 Page 4 of 4
DATED : October 9, 1984
INVENTOR(S) : Hyman R. Lubowitz et al It is certified that error appears in the above-identified patent and that said Letters Patent is hereby corrected as shown below:

| | | | |
|---|---|---|---|
| 3,663,507 | 4,026,871 | 4,189,560 | 4,298,720 |
| 3,708,439 | 4,060,515 | 4,197,397 | 4,299,750 |

Also add the following Foreign Patent Document:

Japanese Patent Application 71068/81.

Signed and Sealed this

Eighth Day of October 1985

[SEAL]

Attest:

DONALD J. QUIGG

Attesting Officer

Commissioner of Patents and Trademarks—Designate